April 16, 1968  F. N. CLARK  3,377,773
THERMOPLASTIC FILM PACKAGING APPARATUS
Filed March 26, 1965  2 Sheets-Sheet 1

INVENTOR
FRANK N. CLARK
BY *Ernest A. Polin*
ATTORNEY

INVENTOR
FRANK N. CLARK

United States Patent Office 3,377,773
Patented Apr. 16, 1968

3,377,773
THERMOPLASTIC FILM PACKAGING APPARATUS
Frank N. Clark, Scotch Plains, N.J., assignor to Allied Chemical Corporation, New York, N.Y., a corporation of New York
Filed Mar. 26, 1965, Ser. No. 443,133
5 Claims. (Cl. 53—178)

ABSTRACT OF THE DISCLOSURE

This invention is directed to a thermoplastic film packaging machine and to a process for packaging articles using said machine. Briefly the machine comprises:

(a) a pair of heated, pocketed rollers,
(b) an endless belt passing over each roller, each belt having openings therein,
(c) drive means which synchronize the movement of the belts and rollers so as to achieve registry of the openings with the pockets, and of the pockets with each other,
(d) means which feed thermoplastic films between the belts,
(e) means which supply the articles to be packaged at spaced points between the films, and
(f) means for severing the packaged articles.

Briefly the process which is carried out by the above-described machine comprises the steps of:

(a) feeding articles at spaced points between the films and sealing the films around the articles by the use of the heated, pocketed rollers,
(b) conducting the sealed articles away from the heated pocketed rollers and cooling the films while the articles are positioned in the openings of the two belts, and
(c) severing the thus-packaged articles.

---

This invention relates to packaging procedures and equipment and more particularly to process and apparatus for packaging small items, such as pharmaceutical pills, sutures, blood sponges, tablets, capsules, small bearings, metal parts, electronic components and other items in thermoplastic films so that the individual items or a predetermined number thereof are hermetically sealed within a film pouch or wrapper.

Packaging machines are known for packaging such items employing supported films, such, for example, as cellophane (a non-thermoplastic cellulose film covered on both sides with a nitrocellulose thermoplastic coating), aluminum foil coated with thermoplastic films such as polyethylene, polypropylene, cellulose acetate, vinylidine chloride copolymers (Saran), polyamides, e.g., nylon, and fluorochlorohydrocarbon films; or paper coated with such thermoplastic films. Other laminates or supported films employed in known packaging machines are polyester-polyethylene laminates, cellophane-polyethylene laminates, and polyester-rubber hydrochloride laminates. Employing such laminates or supported films, the higher melting point material retains sufficient tensile strength while the heat applied is sufficiently low, to fuse and weld the lower melting point material, e.g., the polyethylene in the case of polyester-polyethylene laminates, or the rubber hydrochloride in the case of polyester-rubber hydrochloride laminates, to form the hermetic seal.

To produce a non-supported or single ply thermoplastic film pouch or wrapper in known equipment, it has been the practice to associate a low melting point thermoplastic film with a film of higher melting point, and after the packaging of the item or items has been accomplished, and the marginal edges of the resultant package heat-sealed to form a hermetic closure, to strip away and discard the higher melting point film, such as the polyester or cellophane film.

These packaging procedures are objectionable for a number of reasons, including:

(a) Substantial waste and trim losses are necessarily entailed in conditioning the film to render it suitable for use in presently available packaging equipment. This loss is particularly marked in procedures involving the association of a higher melting film with a lower melting film followed by stripping away the higher melting film after the package is formed. Even in procedures not involving such stripping, there is considerable waste and trim losses in producing laminates or supported films required by available packaging equipment.

(b) The layers or ply of laminated or supported film are usually bonded by adhesives containing solvents which upon evaporation cause the adhesive to bond the film layers. These solvents or other components of the adhesive are trapped within the film layers and eventually migrate into the packaged product, contaminating it.

(c) Delamination of the laminates or supported films can occur during storage of the laminates or supported films prior to use due, for example, to plasticizer migration or the effects of ambient storage on the laminate or supported film. When such delamination takes place, the resultant material becomes useless for its intended purpose.

(d) Laminates frequently used in existing equipment, which laminates have the sealing surfaces of the film layer specially designed so that they are reactive and seal readily in existing equipment, have a limited "shelf-life" as compared with the "shelf-life" of the relatively inert or unreactive plastic films.

(e) Laminates and supported films frequently have less transparency than a single ply or unsupported thermoplastic film, such as the polyfluorochloroethylene films. It is not unusual to combine with a transparent, low sealing plastic film, a more heat-resistant outer layer of foil or paper, producing a laminate which is not transparent or is appreciably less transparent than the low heat sealing plastic film. In the case of the packaging of many items, such, for example, as pharmaceutical pills, tablets, capsules or sutures, the transparency of the wrapper adds greatly to the sales appeal of the packaged item.

It is a principal object of the present invention to provide a packaging machine capable of packaging items, such as those hereinabove mentioned, in unsupported thermoplastic films, i.e., single ply films with the heat-sealing of the films to form a hermetically sealed package for the item or items enclosed therein, resulting in the production of a package of good overall appearance and good seal strength.

Another object of this invention is to provide a process of packaging one or more items in either laminated or non-supported thermoplastic films which tend to stretch at elevated temperatures to form hermetic heat-sealed packages.

Still another object of this invention is to provide such process employing as or in the packaging film, unsupported thermoplastic films of polyhaloethylene noted for their strength and unusually good transparency. Examples of such films are the homopolymers of trifluoromonochloroethylene; the copolymers of chlorotrifluoroethylene and vinylidine fluoride, and the terpolymers of chlorotrifluoroethylene, vinylidine fluoride and tetrafluoroethylene. These unsupported thermoplastic films are available commercially; they are sold, for example, by the General Chemical Division of Allied Chemical Corportion under its "Aclar" trademark and by Minnesota Mining and Manufacturing Corporation under its "Kel-F" trademark.

For a fuller understanding of the nature and objects of this invention reference should be had to the following drawings in which.

Figure 1:
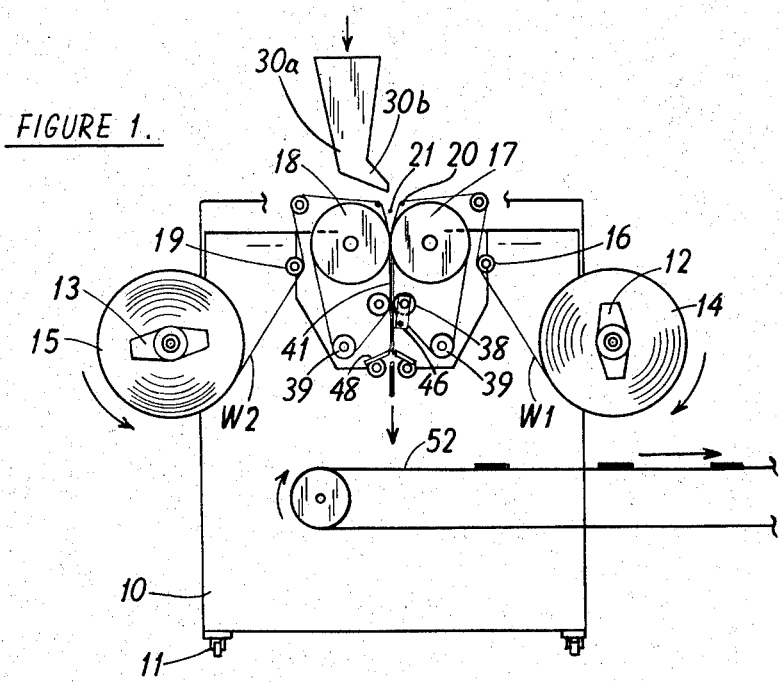
FIGURE 1 is a side elevational view of a preferred form of packaging machine embodying this invention.

Referring first to FIGURE 1, the packaging machine, shown for illustrative purposes, comprises a frame 10 supported by casters 11, in known manner, so that the machine is freely movable to any one of several loading stations. Suitably mounted on the frame 10 are the usual spools 12 and 13, each for a roll 14 and 15, respectively, of unsupported thermoplastic film which can be any of the commercially available films employed for packaging purposes; preferred are the polyhaloethylene films above disclosed. The web W1 of film from roll 14 is drawn over the idler rollers 16 mounted on frame 10 to pass vertically downwardly between the bite of the die packaging rollers 17 and 18. The web W2 of film from roll 15 passes over idler rollers 19 to pass vertically downwardly in contact with the web W1. The webs W1 and W2, which are of the same width, thus pass in alignment in face-to-face relation vertically downwardly through feeding station 21 where the material to be packaged is fed between the webs as they enter the bite between the die packaging rollers 17 and 18. Optionally, before entering the bite of rollers 17 and 18, the webs may pass over guides 20, which preferably are laterally adjustable to control the dwell of the webs in contact with the packaging rollers. If the guides are used, their adjustment by movement toward each other decreases the dwell. In this manner, the dwell can be adjusted to accommodate the melting and sealing characteristics of differing film which may be used in practice of the invention, such as polyhaloethylene film referred to above, polyethylene film, polypropylene film, nylon film, or polyvinylchloride film, each of which may be used as a single ply or in the form of laminates of the same or different film materials.

Figure 3:
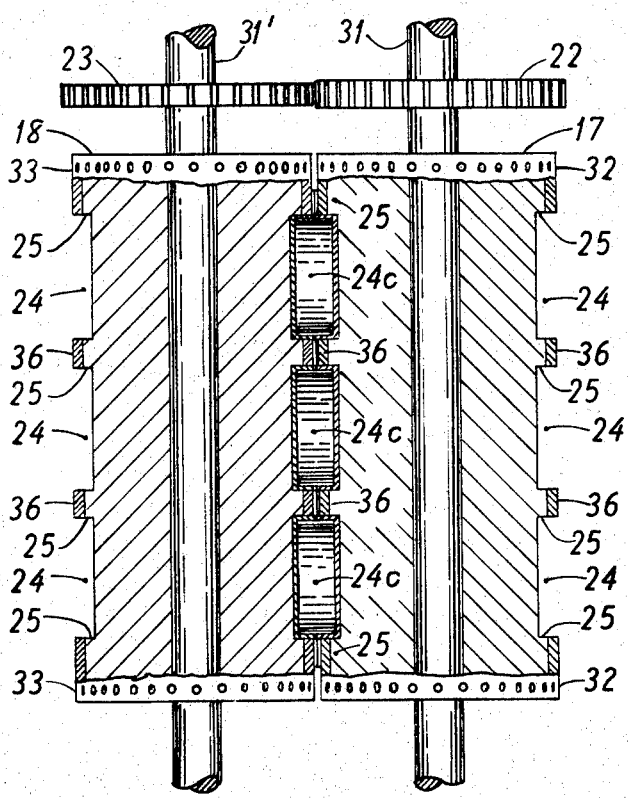
FIGURE 3 is a horizontal sectional view through the packaging die rollers of the machine of FIGURE 1.

As the webs, in face-to-face relation, are fed through the die packaging rollers 17 and 18, the marginal areas thereof surrounding the items packaged therein are heat-sealed to form a pouch or wrapper. For this purpose, as best shown in FIGURE 3, each of the rollers 17 and 18 is provided with spaced rows of pockets or die cavities 24, which will be referred to herein as pockets. Rows each containing three pockets 24, with each row extending axially of each roller 17 and 18, are employed in the die packaging rollers of the drawings. The number of such rows as well as the shape and number of the pockets in each row can differ from the showing of the drawing which illustrates a machine for producing the so-called substantially rectangular pillow pouch packages formed by the rectangular pockets 24. The circumferential raised areas 25 and the transverse raised areas 26 (FIGURE 2) define the four sides of the respective pockets 24 in each die packaging roller 17 and 18.

The die packaging rollers are heated by any suitable heating means. In the embodiment of the invention shown in FIGURE 2, the die packaging rollers 17 and 18 are provided with electrical heaters in circuit with electrical contactor 27 (FIGURE 2) receiving current from a source such as that which supplies the energy for a motor (not shown) driving belt 28 passing over pulley 28a on shaft 31 on the die packaging roller 17. Shaft 31 has thereon a gear 22 which meshes with a gear 23 on the shaft 31' of the die packaging roller 18; the die packaging rollers are thus driven in synchronism.

Figure 2:
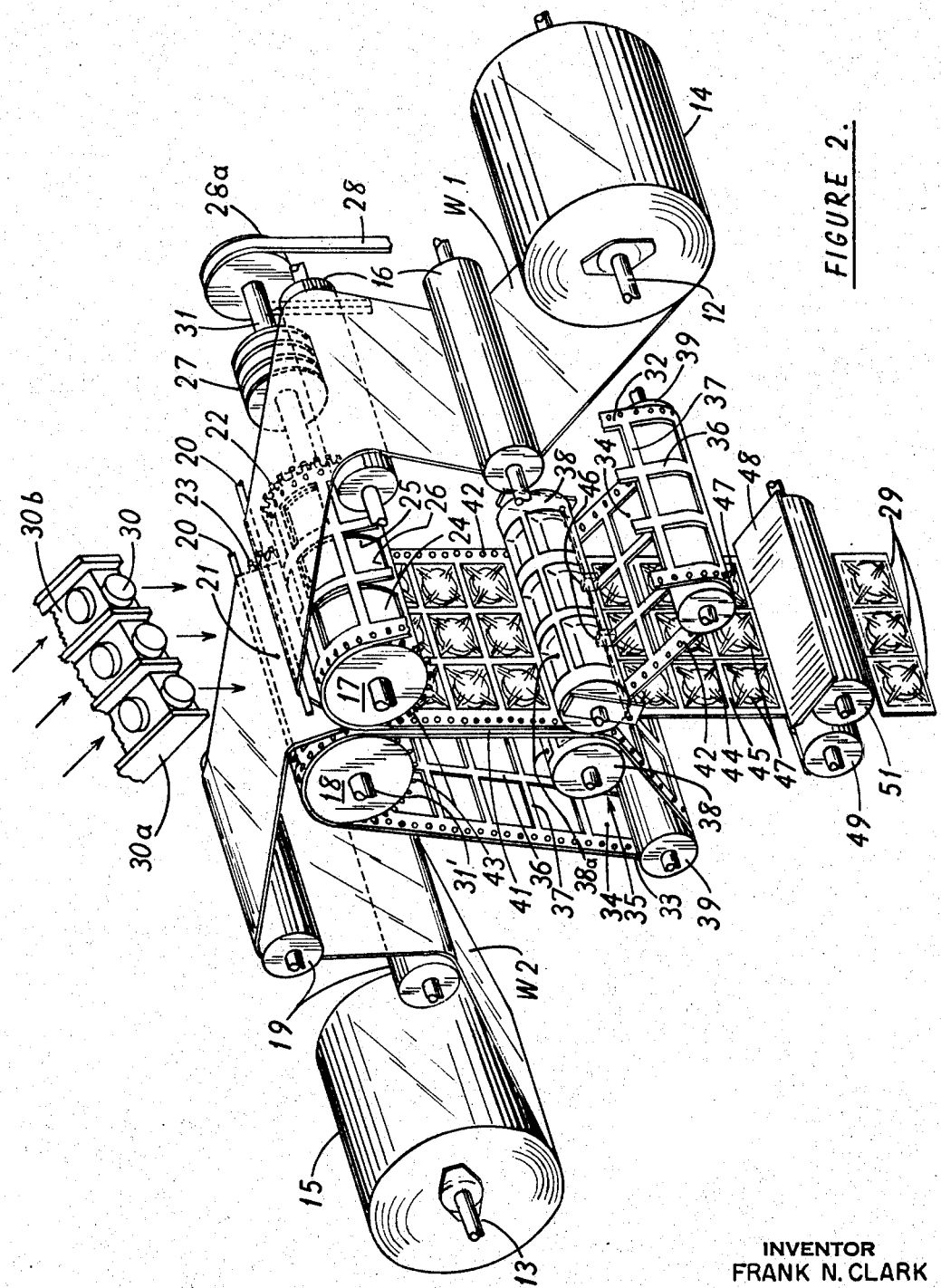
FIGURE 2 is a fragmentary perspective view, on a larger scale than the scale of FIGURE 1, of the machine of FIGURE 1.

As rollers 17 and 18 are thus rotated, the respective pockets 24 in both of these rollers are brought into registry, as clearly shown in FIGURE 3, to form packaging cavities 24c (FIGURE 3) which produce interconnected pillow pouch packages 29 (FIGURE 2), each heat-sealed on all four sides and containing the packaged material, such as the pills 30 (FIGURE 2).

In accordance with this invention, the machine is provided with a pair of belts 32 and 33, each provided with openings 34 of substantially the same size and shape as the pockets 24. Thus for the packaging machine shown in the drawings having successive axially extending rows of pockets 24, each row containing three such pockets, each belt 32 and 33 contains substantially parallel crosswise extending rows 35 of openings 34, each row containing three openings 34 defined by the longitudinally extending solid areas 36 and transverse solid areas 37 of each belt. Each belt in its travel has the respective solid areas 36 and 37 overlying the circumferential raised areas 25 and transverse raised areas 26 of the die packaging rollers 17 or 18 over which the belt travels. Each belt is positioned for travel over a die packaging roller 17 or 18, and a pair of idler rollers 38 and 39, as best shown in FIGURE 2. Idler rollers 38 have channels 38a arranged to form recesses for the pollow pouch packages. Each idler roller 38 is positioned below the die packaging roller 17 or 18 with which it cooperates to provide for a vertical path of travel 41 of the interconnected pillow pouch packages 29 long enough for the heated plastic film to cool and form firm hermetic seals. Thus vertical path 41 is a cooling zone for effecting cooling of the heat seals; in the travel of the interconnected pouches through this cooling zone they are supported by the belts 32 and 33; these belts maintain the webs W1 and W2 in sealing engagement with each other. Idler rollers 39 provide for the return path of travel of the belts passing thereover to the die packaging rollers.

The belts 32 and 33, it will be noted, pass in direct contact with and over the respective die packaging rollers 17, 18 with the film webs W1 and W2 in contact with each other at least in the marginal areas forming each pillow pouch package 29 and sandwiched between the belts 32 and 33. Thus the belts prevent or minimize contact between the heat-sealed areas of the film and the heating and the pressure exerting surfaces of the die packaging rollers 17 and 18 which effects the formation of the heat-seals. This feature and the material of construction of the belts, hereinafter more fully disclosed, prevent adherence of the heated unsupported plastic film to the die packaging rollers; sticking of the heated plastic to the heat-sealing areas of the die packaging rollers is a major factor responsible for the production of defective or damaged packages. The present invention eliminates this difficulty in that it prevents such adherence from taking place.

The belts 32 and 33 are preferably of woven glass-fiber cloth impregnated with polytetrafluoroethylene (Teflon) or silicone so that they have a surface to which the heated plastic film wrapper does not tend to stick, herein termed an anti-stick surface. Instead of woven glass-fiber cloth belts, thin gauge flexible steel belts with or without Teflon, silicone or molybdenum anti-stick coatings thereon can be used. Also, certain high melting point grades of thermoplastic materials, such as polyester film, can serve as belt material or coating. Belts must have good dimensional stability at the heat temperatures to be used.

It is important that good registry be maintained between the openings 34 in the belts 32 and 33 and the pockets 24 in the die packaging rollers 17, 18. This is accomplished in the embodiment of the invention shown in the drawing by utilizing the driven die packaging rollers for engagement with substantially congruent rows of openings 42 in the belts which are designed to cooperate with two rows of circumferential disposed upstanding pins 43 on the die packaging roller 17 or 18 over which the belt travels. Instead of having the rows of pins on the die packaging rollers and a row of openings in each side of each belt, a reverse arrangement can be used, namely, each belt provided with pins or shallow studs for engagement with substantially congruent rows of openings in the marginal areas of the cooperating die packaging roller. Alternatively, each of the shafts 31 and 31' can be provided with a sprocket or other toothed member for engagement in a row of marginal openings in the belt to insure proper movement of the belt relative to the peripheral movement of its die packaging roller and thus obtain registry between the pockets 24 and the openings 42 in the belt.

The interconnected assembly of pillow pouch packages 29 thus produced as shown in FIGURE 2 have longitudinally extending sealed areas 44 and transversely extending sealed areas 45; these sealing areas 44 and 45 form the connecting sealed areas between the individual packages 29. To separate the assembly into individual packages, slitting knives 46 are suitably mounted below the end of the cooling path 41 to cut the assembly along lines approximately midway between the width of the intermediate heat-sealing areas 44 forming individual strips 47 each consisting of a longitudinally extending row of pouch packages 29. These strips 47 are separated into individual pouch packages 29 by the transverse cutter 48 which cuts the transverse sealing areas 45 at about their median. These pouch packages are fed by feed rollers 49, 51 onto a conveyor 52 (FIGURE 1) which discharges them from the packaging machine.

It will be appreciated that the longitudinally extending sealing areas 44, including those at the longitudinal side edges of webs W1 and W2, and the transverse sealing areas 45, are formed by the pressure exerted on these areas through the solid portions of belts 32 and 33 by the raised portions of the die packaging rollers surrounding the pockets 24 therein. In the embodiment shown on the drawing, the heat to soften the thermoplastic film is supplied through the belts 32 and 33 by the heated raised areas of the die packaging rollers which also apply the initial pressure to the heated areas to effect the seals. The heat source, however, need not be the die packaging rollers. Other sources of heat to soften the sealing areas of the unsupported film can be used, such, for example, as flash or impulse heating by electrical or sonic energy, or the die rollers can be cored to permit hot oil circulation.

While the machine shown involves the feed of two webs W1 and W2 in face-to-face relation, it will be understood that this invention is applicable to packaging, feeding a tube or folded sheet of unsupported thermoplastic film into the bite of the die packaging rollers and feeding the articles into this tube as it enters the bite between the die packaging rollers. While the machine of the drawings involves the formation of a crosswise extending row of three pillow pouch packages, the machine can be designed to form simultaneously any desired number of packages in a row, say two, four or more, or only one package at a time, i.e., to produce a longitudinally extending strip of packages which after heat-sealing and cooling of the heat-seals is cut transversely into individual packages.

In operation, the webs of film, W1 and W2, for example, single ply or unsupported polyhaloethylene film, are fed into the bite of the die packaging rollers 17, 18, at which point the items to be packaged, e.g., the pills 30, are fed therebetween from the feed hopper 30a positioned above the bite of the die packaging rollers 17 and 18, as shown in FIGURE 2. Instead of feed hopper 30a any other suitable feed for the material to be packaged, such as the pills 30, can be used. Feed hopper 30a can be of any conventional type to feed successively three pills 30 through the discharge chutes 30b so that the three pills are introduced between the webs W1, W2 and upon rotation of the die packaging rollers 17, 18 are disposed in the packaging cavities formed by registry of the pockets 24 in the respective die packaging rollers 17, 18. The openings 34 in the belts 32 and 33, which openings are in accurate registry with the pockets 24 forming the die packaging cavity, enable the pills 30 to be positioned in the die packaging cavities 24c (FIGURE 3).

Feed of the webs W1 and W2 is effected by these belts 32 and 33 which are driven by the drive for the die packaging roller. Thus the openings 34 in the belts which register with the pockets 24 in the die cavities permit the packaging of the pills 30 to be effected within the plastic films W1 and W2 completely enclosing each pill in a pillow pouch individual thereto, the pillow pouches being interconnected along longitudinally extending sealing areas 44 and transverse areas 45.

Heat from the raised areas of the packaging rollers 17 and 18 is imparted through the solid portions of the belts to effect the formation of heat-seals along these areas 44 and 45 as the die packaging rollers rotate and each extending row of pockets 24 in one of the die packaging rollers 17 or 18 is brought into registry with a row of pockets 24 in the other die packaging roller to form a row of three side-by-side interconnected pillow pouch packages 29. In the continued movement of rollers 17 and 18 heat-sealing pressure is exerted by the die packaging rollers on the sealing areas 44 and 45. Each row of pillow pouch packages, as thus formed, leaves the die packaging rollers, and remains under the pressure exerted by the belts 32 and 33 during their travel through the cooling path 41. These belts provide support for the assembly of pillow pouch packages as well as a positive feed therefor. During the travel of the assembly through the cooling path 41 the heat seals produced become set and strong. If desired, forced circulation of air or other cooling gas can be employed along path 41 to facilitate the cooling and obtain the desired setting of the heat-seals.

When the assembly of interconnected pillow pouches reaches the vertical slitters 46, the heat-seals have sufficient strength to be cut. In the continued movement of the longitudinally extending strips of pillow pouch packages the strips are cut into individual packages 29 which are fed by the feed rollers 49 and 51 to the discharge conveyor 52.

It will be noted that the present invention provides an efficient packaging machine for packaging material in unsupported thermoplastic films to form hermetically sealed packages of good overall appearance and good seal strength. This packaging machine has been used to package items in unsupported polyhaloethylene films with the formation of hermetically sealed packages, the wrapper of which has the improved transparency, tensile strength and chemical inertness which characterizes the polyhaloethylene thermoplastic films. In that this invention enables the efficient packaging of materials in unsupported films, it overcomes the objections of heretofore known techniques of packaging in laminates or supported films.

Since certain changes in carrying out the above process of packing material in unsupported film and in the apparatus for the practice of this process, which embody the invention, can be made without departing from its scope, it is intended that all matter contained in the above description or shown in the accompanying drawings shall be interpreted as illustrative and not in a limiting sense.

I claim:
1. A thermoplastic film packaging machine, comprising in combination,
    (a) a pair of die packaging rollers having at least one pair of pockets in the periphery thereof arranged to be brought into registry to form a packaging cavity, each of said pockets being defined by areas of said die packaging roller raised relative to the base of said pocket;
    (b) an endless belt for each die packaging roller having openings therein arranged upon movement of the belt and the die packaging roller to have an opening in said belt register with the pocket in the die packaging roller;

(c) means to move each belt and its die packaging roller in synchronism to bring an opening in said belt in registry with the pocket in said die packaging roller when the latter is in position to receive material to be packaged and with the area of said belt defining the opening overlying the raised area of the die packaging roller defining the pocket;

(d) means to feed thermoplastic film having two surfaces in face-to-face relation into and down through the bite between the die packaging rollers with the said belts interposed between said film surfaces and the periphery of the die packaging rollers;

(e) means to supply the material to be packaged between the said two film surfaces to the packaging cavity; and (f) means to heat at least the areas of said film surfaces overlying said raised areas, movement of said die packaging rollers and said belts applying pressure to said heated areas of the film surfaces to seal them and thus enclose the material to be packaged.

2. The thermoplastic film packaging machine of claim 1, in which the said belts support the said two surfaces of thermoplastic film in face-to-face relation with the material packaged therein and provide a path of travel with the said two surfaces so supported extending from the die packaging rollers for effecting cooling of the heat-seals formed by the die packaging rollers.

3. A thermoplastic film packaging machine, comprising in combination, (a) a pair of die packaging rollers having at least one pair of pockets in the periphery thereof arranged to be brought into registry to form a packaging cavity, each of said pockets being defined by areas of said die packaging roller raised relative to the base of said pocket;

(b) an endless belt for each die packaging roller having openings therein arranged upon movement of the belt and the die packaging roller to have an opening in said belt register with the pocket in the die packaging roller;

(c) means to move each belt and its die packaging roller in synchronism to bring an opening in said belt in registry with the pocket in said die packaging roller when the latter is in position to receive material to be packaged and with the area of said belt defining the opening overlying the raised area of the die packaging roller defining the pocket;

(d) means to feed two webs of unsupported thermoplastic film in face-to-face relation into and down through the bite between the die packaging rollers with the said belts interposed between said film webs and the periphery of the die packaging rollers;

(e) means to supply the material to be packaged between the said two film webs to the packaging cavity;

(f) means to heat the areas of said film webs adjacent the material to be packaged and to seal the heated areas to form interconnected sealed pouches each containing the material to be packaged; and (g) means to sever the interconnected packages to separate them.

4. A thermoplastic film packaging machine, comprising in combination, (a) a pair of rotatable die packaging rollers each having in its periphery a plurality of axially extending rows of pockets, each pocket being defined by areas of the die packaging roller raised relative to the base of said pocket and the respective rows of one die packaging roller being brought into registry with the rows of the other die packaging roller of the pair, upon rotation of the die packaging rollers;

(b) an endless belt having an anti-stick surface for each die packaging roller having a plurality of rows of openings therein, the rows being arranged along the length of the belt with the number of openings in each row being the same as the number of pockets in each row of pockets in said die packaging rollers, the openings in said belt being shaped and positioned to register with the pockets in the die packaging roller over which the belt passes, said belt passing over the die packaging roller, then extending substantially vertically downwardly below its die packaging roller to provide a cooling path;

(c) means to move each belt and its die packaging roller in synchronism to bring each row of openings in said belt in registry with the row of pockets in said die packaging roller when the latter is in position to receive material to be packaged and with the portions of said belt defining the openings therein overlying the raised areas of the die packaging rollers defining a row of pockets therein;

(d) means to feed two webs of unsupported thermoplastic film in face-to-face relation into and down through the bite between the die packaging rollers with the said belts interposed between said film webs and the periphery of the die packaging rollers, and the said anti-stick surfaces of the belt in contact with the surfaces of the film webs;

(e) means to supply the material to be packaged between said two webs of film to each of the die cavities of the row of said cavities formed by registry of a pair of rows of pockets in the pair of die packaging rollers;

(f) means to heat the raised areas of the die packaging rollers and thus heat, through the solid areas of said belts, the film areas overlying said raised areas of the die packaging rollers and to press together the heated areas to form hermetic heat-seals completely enclosing the material to be packaged and form an interconnected assembly consisting of longitudinally extending rows of sealed pouches each containing packaged material;

(g) means to sever the interconnected assembly along longitudinally extending lines positioned substantially midway between longitudinally extending rows of said sealed pouches to form separate strips of interconnected pouch packages, said severing means being positioned adjacent the end of the cooling path of travel of said belts; and (h) means to sever said strips along lines positioned substantially midway between adjacent pouch packages.

5. The thermoplastic film packaging machine of claim 4, in which each belt is of woven glass-fiber impregnated with polytetrafluoroethylene.

References Cited

UNITED STATES PATENTS

| | | | |
|---|---|---|---|
| 2,141,318 | 12/1938 | Salfisberg | 53—28 |
| 2,525,651 | 10/1950 | Clunan | 53—28 |
| 2,759,308 | 8/1956 | Nawrocki | 53—180 |

WILLIAM W. DYER, JR., *Primary Examiner.*

G. Y. CUSTER, JR., *Examiner.*